(12) United States Patent
Waggoner et al.

(10) Patent No.: US 10,412,412 B1
(45) Date of Patent: Sep. 10, 2019

(54) USING REFERENCE-ONLY DECODING OF NON-VIEWED SECTIONS OF A PROJECTED VIDEO

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 311 days.

(21) Appl. No.: 15/282,771

(22) Filed: Sep. 30, 2016

(51) Int. Cl.
| | |
|---|---|
| *H04N 19/597* | (2014.01) |
| *G06T 9/00* | (2006.01) |
| *H04N 19/44* | (2014.01) |
| *H04N 19/109* | (2014.01) |
| *H04N 19/172* | (2014.01) |
| *H04N 19/31* | (2014.01) |

(52) U.S. Cl.
CPC ............ *H04N 19/597* (2014.11); *G06T 9/00* (2013.01); *H04N 19/109* (2014.11); *H04N 19/172* (2014.11); *H04N 19/31* (2014.11); *H04N 19/44* (2014.11)

(58) Field of Classification Search
CPC .. H04N 19/597; H04N 19/109; H04N 19/172; H04N 19/31; H04N 19/44; G06T 9/00
USPC ................................................... 375/240.25
See application file for complete search history.

(56) References Cited

U.S. PATENT DOCUMENTS

| | | | |
|---|---|---|---|
| 5,652,616 | A | 7/1997 | Chen et al. |
| 5,734,419 | A * | 3/1998 | Botsford, III ........ H04N 19/176 348/700 |
| 6,072,831 | A | 6/2000 | Chen |
| 6,111,596 | A | 8/2000 | Haskell et al. |
| 9,078,008 | B2 | 7/2015 | Ye et al. |
| 9,769,450 | B2 | 9/2017 | Xu et al. |
| 9,774,887 | B1 | 9/2017 | Walkingshaw |
| 10,225,546 | B2 * | 3/2019 | Gupte .................. H04N 13/178 |
| 2005/0018911 | A1 | 1/2005 | Deever |
| 2006/0013490 | A1 | 1/2006 | Sun |
| 2007/0183495 | A1 | 8/2007 | Kim |
| 2008/0008241 | A1 | 1/2008 | Park |
| 2011/0134214 | A1 | 6/2011 | Chen et al. |
| 2011/0317760 | A1 | 12/2011 | Chen et al. |
| 2012/0027079 | A1 | 2/2012 | Ye et al. |
| 2012/0042090 | A1 * | 2/2012 | Chen ..................... H04L 65/604 709/231 |
| 2012/0057002 | A1 | 3/2012 | Grafulla-Gonzalez et al. |
| 2013/0112750 | A1 * | 5/2013 | Negro ................ G06K 7/10871 235/454 |
| 2013/0182073 | A1 | 7/2013 | Yin et al. |

(Continued)

OTHER PUBLICATIONS

Mary-Luc Champel, "The Special Challenges of Offering High Quality Experience for VR video," Power point Presentation, 2016 Annual Technical Conference & Exhibition, 15 pages.

(Continued)

*Primary Examiner* — Deirdre L Beasley
(74) *Attorney, Agent, or Firm* — Weaver Austin Villeneuve & Sampson LLP

(57) ABSTRACT

Techniques are described that enable virtual reality content to be delivered. These techniques include decoding reference frames of video content for non-viewed sections of the video content.

20 Claims, 6 Drawing Sheets

(56) References Cited

U.S. PATENT DOCUMENTS

| | | | |
|---|---|---|---|
| 2013/0287123 A1 | 10/2013 | Rusert et al. | |
| 2014/0301459 A1 | 10/2014 | Boyce et al. | |
| 2014/0328389 A1 | 11/2014 | Fu et al. | |
| 2015/0304681 A1 | 10/2015 | An et al. | |
| 2015/0312545 A1 | 10/2015 | Xu et al. | |
| 2016/0011923 A1* | 1/2016 | Walker | H04L 65/80 714/49 |
| 2016/0012855 A1* | 1/2016 | Krishnan | G11B 27/105 386/241 |
| 2016/0358383 A1 | 12/2016 | Gauglitz et al. | |
| 2017/0026659 A1* | 1/2017 | Lin | H04N 19/597 |
| 2017/0076674 A1 | 3/2017 | Shintani | |
| 2017/0155885 A1 | 6/2017 | Selstad et al. | |
| 2017/0223300 A1 | 8/2017 | Jang | |
| 2017/0223368 A1 | 8/2017 | Abbas et al. | |
| 2017/0316753 A1 | 11/2017 | Dunn et al. | |
| 2017/0347084 A1* | 11/2017 | Boyce | H04N 19/30 |
| 2018/0041764 A1* | 2/2018 | Lin | G06T 11/60 |

OTHER PUBLICATIONS

Champel, et al., "The Special Challenges of Offering High Quality Experience for VR video," Written Presentation, 2016 Annual Technical Conference & Exhibition, 10 pages.

Pierre Routhier, "Virtually Perfect: Factors affecting the quality of a VR experience and the need for a VR content quality standard," Written Presentation, 2016 Annual Technical Conference & Exhibition, 20 pages.

Ng, King-To, Shing-Chow Chan, and Heung-Yeung Shum. "Data compression and transmission aspects of panoramic videos." IEEE Transactions on Circuits and Systems for Video Technology 15.1 (2005): 82-95.

Kimata, Hideaki, et al. "Panorama video coding for user-driven interactive video application." Consumer Electronics, 2009. ISCE'09. IEEE 13th International Symposium on. IEEE, 2009.

Heymann, S., et al. "Representation, coding and interactive rendering of high-resolution panoramic images and video using MPEG-4." Proc. Panoramic Photogrammetry Workshop (PPW). 2005.

Sullivan, Gary J., et al. "Standardized extensions of high efficiency video coding (HEVC)." IEEE Journal of selected topics in Signal Processing 7.6 (2013): 1001-1016.

Xiu, Xiaoyu, Gene Cheung, and Jie Liang. "Delay-cognizant interactive streaming of multiview video with free viewpoint synthesis." IEEE Transactions on Multimedia 14.4 (2012): 1109-1126.

U.S. Appl. No. 15/392,652, filed Dec. 28, 2016, Waggoner, et al.

U.S. Appl. No. 15/413,112, filed Jan. 23, 2017, Waggoner, et al.

U.S. Office Action dated May 9, 2018 issued in U.S. Appl. No. 15/413,112.

U.S. Final Office Action dated Nov. 8, 2018 issued in U.S. Appl. No. 15/413,112.

U.S. Office Action dated Mar. 8, 2018 issued in U.S. Appl. No. 15/392,652.

U.S. Final Office Action dated Sep. 17, 2018 issued in U.S. Appl. No. 15/392,652.

\* cited by examiner

USING REFERENCE-ONLY DECODING OF NON-VIEWED SECTIONS OF A PROJECTED VIDEO

BACKGROUND

Virtual reality is a computer technology that replicates an environment, real or imagined, and simulates a user's physical presence in the environment and, in some cases, enables the user to interact with the environment. Typically, virtual reality content is displayed on a computer monitor or with a virtual reality device such as a virtual reality headset, which is also commonly referred to as a head-mounted display. The user may interact with the environment by interacting with the virtual reality device, through the use of a standard input device such as a keyboard or mouse, or through a multimodal device such as a wired glove. As the user interacts with the environment, three-dimensional (3D) images are provided by virtual reality software that accesses virtual reality content.

A number of streaming media services enable multimedia such as movies and television programs to be streamed to client devices. However, since much more visual information needs to be available to simulate a user's presence in a 3D environment, streaming virtual reality content is particularly challenging.

DETAILED DESCRIPTION

Figure 1:
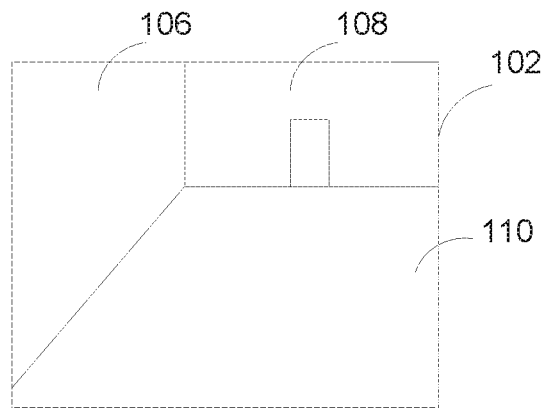
FIG. 1 illustrates an example of an application of a particular implementation.
Figure 1:
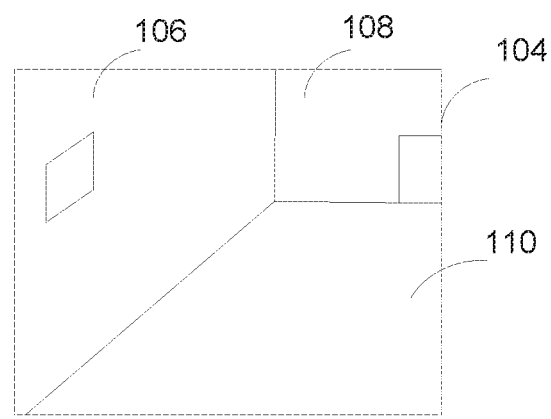
Figure 1:
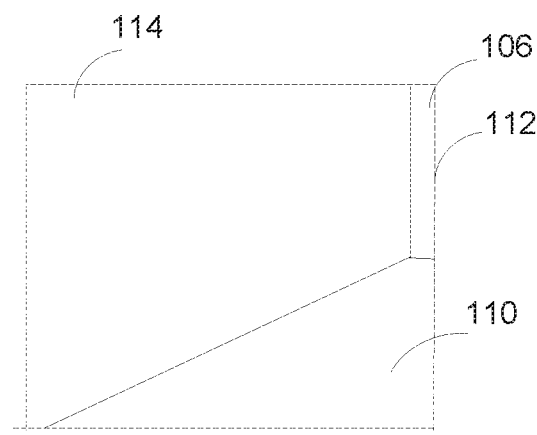

This disclosure describes techniques that enable a virtual reality environment to be rendered by selectively decoding frames associated with portions of the virtual reality environment not currently in view. In accordance with various implementations, virtual reality content is decoded such that reference frames for non-viewed portions of the virtual reality environment are decoded without decoding non-reference frames for the non-viewed portions of the virtual reality environment. When a non-viewed portion subsequently comes into view, the non-reference frames are decoded. By decoding only a subset of the frames associated with non-viewed portions of the virtual reality environment, the virtual reality environment may be simulated at a client device with fewer disruptions to the rendering of the virtual reality content as the user changes position within the virtual reality environment.

Telecommunications networks and other content services commonly stream video to client devices for display on televisions and computer monitors. With the increase in availability of three-dimensional (3D) virtual reality content, some content services offer the streaming of 3D virtual reality content. Since the virtual reality content offers a user the ability to view their virtual environment from a number of viewer-selected perspectives, the amount of data that is typically streamed to offer this capability is significant.

To generate a 3D virtual reality environment, a virtual cube, cylinder, or other three-dimensional shape is typically used to display images of the virtual reality environment as they would be perceived by a user within the virtual reality environment. For a given user position or perspective within the virtual reality environment, there will often be 6 (or more) possible views corresponding to the faces of the three-dimensional shape, which can be rendered separately or simultaneously. More particularly, an image may be generated and displayed for each of the faces of a virtual cube, cylinder, or other three-dimensional shape that would be visible from the perspective of the user within the virtual reality environment at a given point in time. Therefore, a virtual reality environment is typically rendered using 6 (or more) independent video streams.

Generally, when a user interacts with a virtual reality environment, the user's change in position and/or perspective is detected by the client device and frames of the virtual reality content that reflect the user's changed perspective are then downloaded and decoded by the client device. These frames typically correspond to the video streams for all faces of the virtual three dimensional object used to simulate the virtual reality environment at the user's new position. Since the number of frames that are downloaded to the client device and decoded can be substantial and the frames are downloaded and decoded after the user's changed position is detected, the available bandwidth and processing resources may be insufficient to generate and display images at the speed with which the user's position within their virtual environment changes. As a result, the user can perceive disruptions to the video rendered at the client device.

Reference frames are frames of a compressed video that are used to define other frames. As such, they are only used in inter-frame compression techniques. In older video encoding standards, such as MPEG-2, only one reference frame—the previous frame—was used for P-frames. Two reference frames (one past and one future) were used for B-frames.

Some modern video encoding standards, such as H.264, allow the use of multiple reference frames. As a result, some videos may have large numbers of reference frames. When decoding, reference frames are typically stored in memory until they are no longer needed for further decoding. This can considerably raise the memory usage of the decoder for videos with large numbers of reference frames.

FIG. 1 illustrates an example of an application of a particular implementation. In this example, virtual reality software installed on a virtual reality device enables a user to walk through a virtual room. For portions (e.g., views) of virtual reality content that are not currently in view from the user's current position within the virtual reality environment, reference frames are decoded without decoding non-reference frames. As a portion of the virtual reality content comes into view, non-reference frames are decoded. Therefore, images may be presented rapidly as the user walks through the virtual room while reducing the amount of data that is stored and processed at the virtual reality device.

As shown at 102, as the user looks through the virtual reality device, the user perceives himself to be in a room that includes a door. In this example, there are three views that are visible to the user, which correspond to three faces of a virtual cube. As depicted in FIG. 1, the views that are visible to the user include wall 106, wall 108, and floor 110. The virtual reality software decodes reference frames for views that are not currently in view from the position/perspective of the user. For example, the virtual reality software may decode reference frames for the remaining three views that correspond to the ceiling, right wall, and back wall of the room (not shown).

As the user rotates left while holding or wearing the virtual reality device, the user's perspective within the virtual room changes, as shown at 104. More particularly, a painting on wall 106 becomes visible, while the door on wall 108 moves out of view. The virtual reality device detects the user's change in position/perspective. Since the virtual reality software has already decoded the reference and non-reference frames for the view corresponding to wall 106, the virtual reality devices renders an image that reflects the user's change in position/perspective using the relevant reference and non-reference frames.

The user continues to rotate left, as shown at 112. The back wall 114 of the room comes into view. Since the reference frames corresponding to the view representing the back wall 114 were previously decoded while the back wall 114 was not in view, only the non-reference frames corresponding to the back wall 114 are decoded. Therefore, the visible portions of the virtual reality content can be rendered as they come into view without delays or disruptions.

In some instances, the user may change his or her location within the virtual reality environment by "node jumping." This may occur, for example, where the user presses a button on a virtual reality device or moves his or her head while wearing a virtual reality headset. Frames including reference frames and non-reference frames may be decoded to simulate the user's presence at this new location within the virtual reality environment.

The example described above pertains to decoding of virtual reality content. In accordance with various implementations, virtual reality content may also be selectively downloaded. More particularly, reference frames corresponding to non-visible views may be downloaded without downloading corresponding non-reference frames. Therefore, images may be rendered rapidly while minimizing the amount of data that is downloaded and stored at the virtual reality device.

Figure 2:
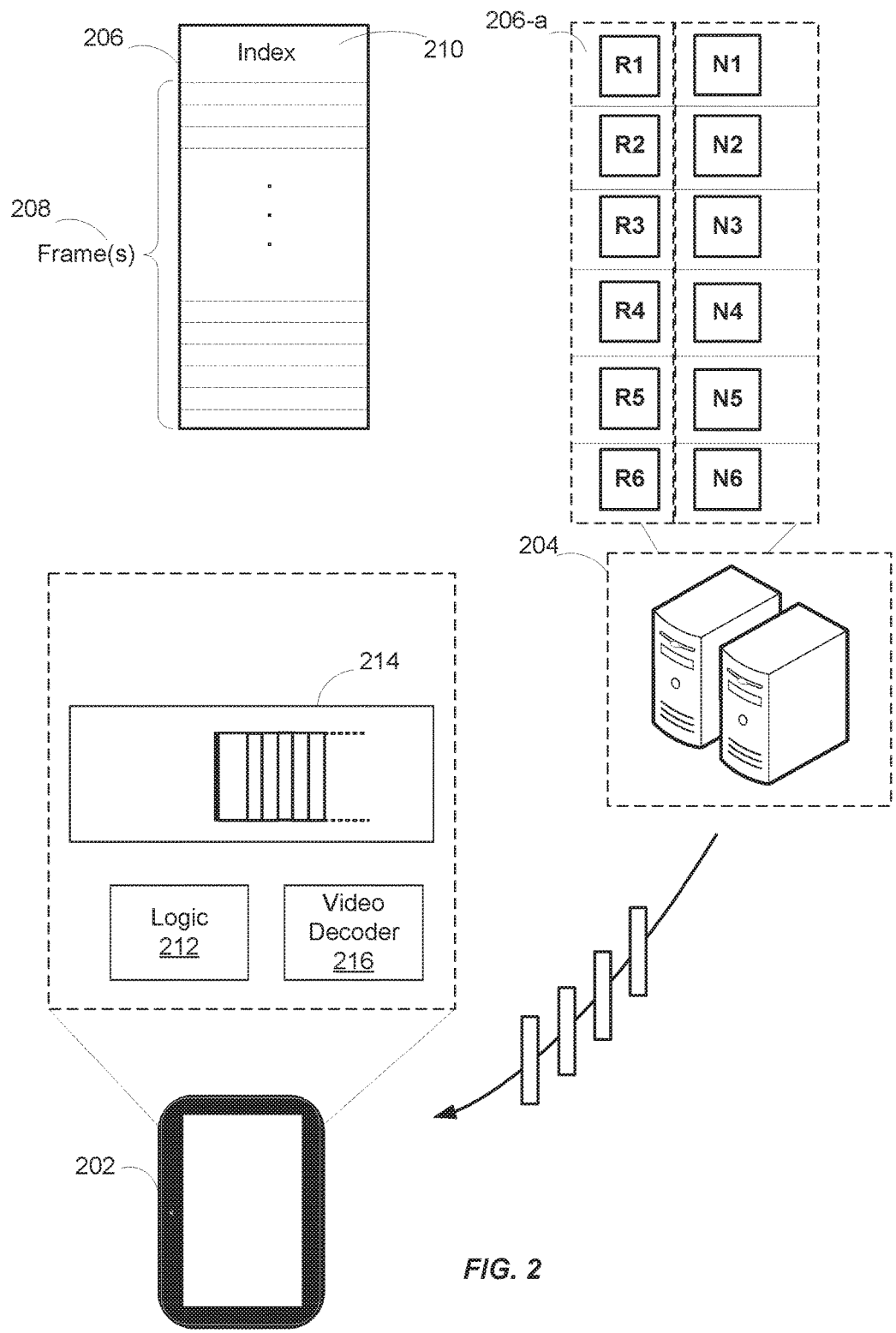
FIG. 2 illustrates the operation of an example of a particular implementation.

FIG. 2 illustrates the operation of an example of a particular implementation. A user of client device 202 browses a catalogue of virtual reality titles available from service 204. When the user selects one of the virtual reality titles, content service 204 streams virtual reality content corresponding to the selected virtual reality title to client device 202. The streaming of virtual reality content to client device 202 is facilitated by virtual reality software installed on client device 202. The virtual reality software operates to provide 3D virtual reality content via a display that is integrated with client device 202 (as shown) or coupled to client device 202, as will be described in further detail below.

Service 204 maintains files associated with the virtual reality titles available from service 204 that enable virtual reality content to be streamed to client devices using service 204. In this example, service 204 selects file(s) 206 that are relevant to the selected virtual reality title. File 206 is a video file that includes frames 208 that have been encoded by a video encoder that operates according to a video encoding standard such as H.264 or H.265. In another implementation, virtual reality content may be generated and encoded dynamically.

As shown in FIG. 2, each file 206 can include one or more media fragments. Each media fragment includes a fragment index 210 and frame(s) 208. In this example, file 206-*a* corresponding to the selected virtual reality title can include a plurality of sets of frames, where each set of frames corresponds to a different one of a plurality of views of the virtual reality content from a particular position or perspective in the virtual environment. More particularly, each set of frames may correspond to a different face, side, or view of a three-dimensional shape such as a cube or cylinder centered on or including that position. Each set of frames is a sequence of frames that includes one or more reference frames and one or more non-reference frames. To simplify the example, each set of frames is shown to include a single reference frame and a single non-reference frame, which are denoted by R and N, respectively. As shown at 206, six sets of frames corresponding to six faces of a virtual cube are represented by frames R1-N1, R2-N2, R3-N3, R4-N4, R5-N5, R6-N6. A reference frame is a frame of a compressed video that is used to define other frames, while a non-reference frame is a frame that is not used to define other frames.

In one implementation, the virtual reality content is encoded according to a scalable encoding standard such as the Scalability extension of High Efficiency Video Coding (HEVC), which is commonly referred to as SHVC. Each view of the virtual reality environment may have corresponding base layer(s) and enhancement layer(s). More particularly, the base layer(s) may include the reference frames for the corresponding view, while the enhancement layer(s) may include the non-reference frames for the corresponding view.

Each fragment of encoded virtual reality content includes several frame types; with the frame type defining the kind of dependency allowed for that frame. In general, dependencies between frames are used to support data compression, i.e., understanding how frames before or after a frame are similar allows encoding only the differences between nearby frames in the same fragment, resulting in significant improvements in bit rate.

An I-frame, or intra frame, is a self-contained frame that can be independently decoded without reference to preceding or upcoming images. The first image in a video sequence is always an I-frame and these frames act as starting points if the transmitted bit stream is damaged. Therefore, each I-frame can be identified as a reference frame.

A P-frame, which stands for predictive inter frame, references earlier I- or P-frames to encode an image. A B-frame, which stands for bi-predictive inter frame, is a frame that references both an earlier reference frame and a future frame. A P-frame may only reference preceding I- or P-frames, while a B-frame may reference both preceding and succeeding I- or P-frames. Encoding standards such as H.264 provide further encoding options that enable a B-frame to be referenced by a P-frame or a B-frame. Therefore, it is possible for a P-frame or B-frame to be a reference frame or non-reference frame.

In one implementation, content service 204 provides information pertaining to the fragments of the virtual reality content to client device 202. For example, content service 104 may provide a manifest file that indicates locations (e.g., URLs and/or byte offsets) at which the fragments or portions thereof can be accessed. Client device 202 can use the manifest to download fragments or portions thereof. For example, client device 202 can download a fragment header including a fragment index that can be used to download frames, as will be described in further detail below.

Logic 212 of client device 202 may download video fragment(s) from content service 204 and store the fragment(s) in memory 214 (or buffer). Alternatively, logic 212 may selectively download frames of the video fragments from content service 204 and store the frames in memory 214. In one implementation, reference frames for views that are not visible from the current position/perspective may be downloaded without downloading non-reference frames for the views. When a non-visible view subsequently becomes visible, corresponding non-reference frames are downloaded. In this example, reference frames R1-R6 are downloaded, while non-reference frames N1-N3 corresponding to the views that are currently visible are downloaded.

As logic 212 selects reference frames and/or non-reference frames for decoding, logic 212 provides the selected frames to a video decoder 216. More particularly, logic 212 selects reference frames for views that are not currently visible. For those views that are visible, logic 212 selects non-reference frames. If reference frames associated with a currently visible view have not already been decoded, logic also selects reference frames for the view. Video decoder 216 decodes the frames to generate the corresponding digital images representing the various views of the virtual reality environment.

In one implementation, reference frames are decoded for view(s) that are not currently visible from the current position/perspective without decoding corresponding non-reference frames. Non-reference frames associated with only visible views are decoded. In this example, reference frames R1-R6 are decoded, while non-reference frames N1-N3 corresponding to the currently visible views are decoded.

Logic 212 may download and/or decode frames according to a predictive model. In one implementation, logic 212 applies a predictive model to predict views most likely to be selected or viewed next (e.g., within a period of time) by the user.

Figure 3:
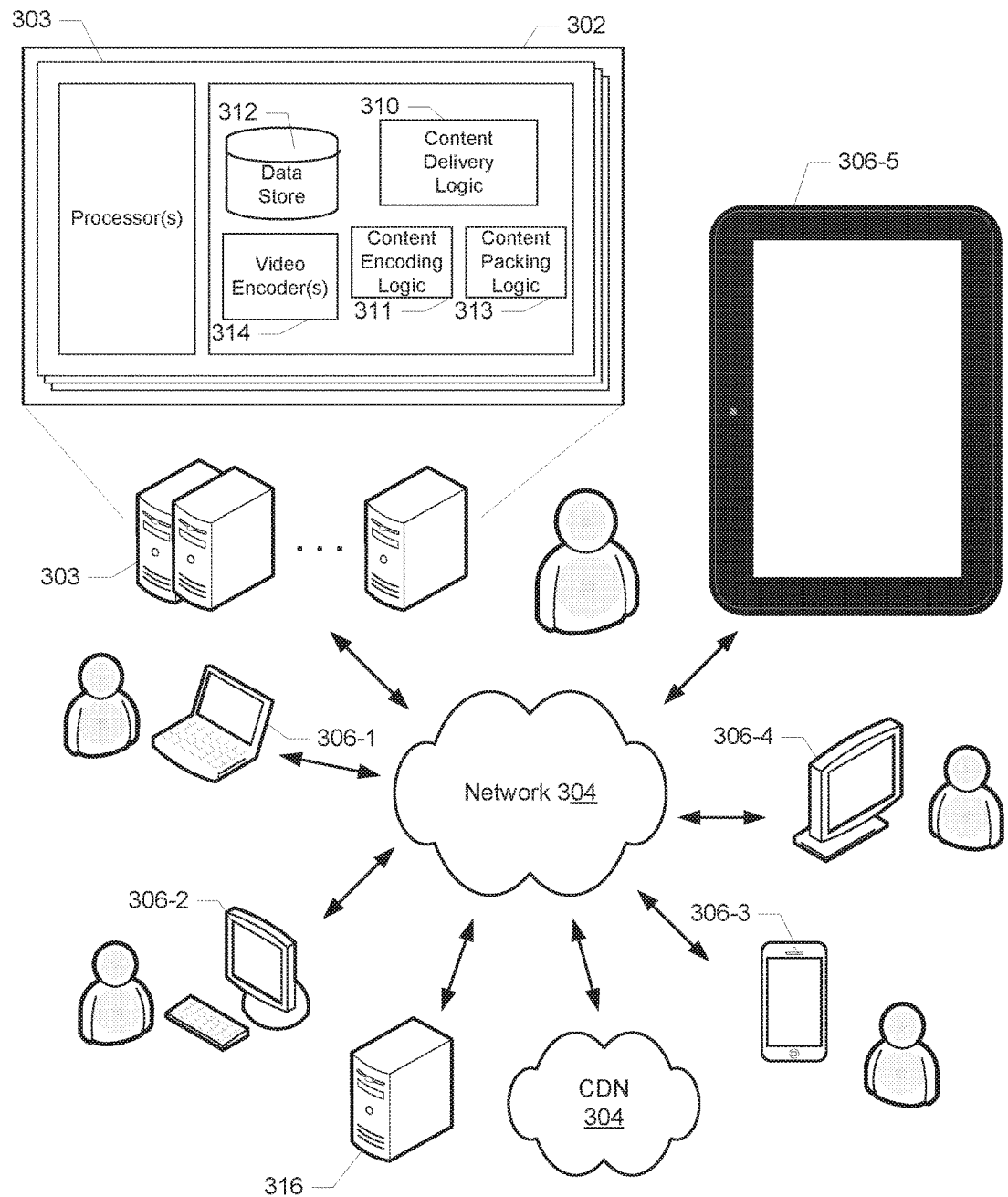
FIG. 3 is a simplified diagram of a computing environment in which various implementations may be practiced.

FIG. 3 illustrates an example of a computing environment in which a service 302 such as a content service provides virtual reality content via network 304 to a variety of client devices (306-1 through 306-5) in accordance with the techniques described herein. More particularly, the content may include virtual reality video-on-demand (VOD) content or broadcast content (e.g., 3D video of live events).

Content service 302 includes content delivery logic 310 which facilitates various aspects of content delivery to client devices 306. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and downloading or consuming streams of VOD or broadcast content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches, smart glasses, or virtual reality headsets), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 304) that may or may not be independent of content service 302. In addition, the source of the content may or may not be independent of content service 302 (e.g., as represented by content provider server 316).

Implementations enabled by the present disclosure contemplate logic and video decoder(s) resident on the client devices consuming content from content service 302; such logic and video decoder(s) being configured to download and decode frames of 3D virtual reality video files as described herein and display the resulting images. The logic and/or decoder(s) might be part of an existing algorithm or module on the client device or implemented to work in conjunction with such an algorithm or module. The logic and/or decoder(s) might be implemented, for example, in a media player on the client device, as a browser plug-in, or as a separate application or module resident on the client device.

Implementations are also contemplated in which, in addition to content delivery logic 310 (which facilitates various aspects of content delivery to client devices 306), content service 302 may include logic that facilitates at least some aspects of the encoding of content as described herein (e.g., as represented by content encoding logic 311). Encoding logic 311 might encode reference and non-reference frames according to a particular algorithm, pattern, or order. More particularly, encoding logic 311 may encode a frame based, at least in part, upon whether the frame is a reference frame or non-reference frame and/or the type of frame (e.g., I, P, B). In one implementation, encoding is performed such that the distribution of I-frames, P-frames, and B-frames is optimized to facilitate the decoding of frames, as described herein. For example, a frame may be encoded as an I-frame rather than a P-frame to eliminate dependences of the frame on other frames, enabling the frame to be decoded without prior downloading or decoding of additional frames.

The frames associated with virtual reality content may be encoded according to a particular video encoding standard or multiple encoding standards. More particularly, encoding logic 311 can employ one or more video encoders 314, where each video encoder 314 operates according to a different video encoding standard. In one implementation, video encoder 314 is configured to encode virtual reality content according to an encoding standard such as H.264 or H.265. In some implementations, video encoder 314 operates according to a scalable video encoding standard such as SHVC. As will be appreciated, video encoding can be implemented in software and/or hardware.

In some implementations, content service 302 also includes content packing logic 313. Content packing logic 313 may pack encoded frames in a particular order or pattern to facilitate the downloading and/or decoding of frames associated with a particular fragment or view. In one implementation, content packing logic 313 may pack frames such that frames are grouped according to frame type (e.g., I-frame, B-frame, P-frame, reference B-frame, reference P-frame, non-reference B-frame, non-reference P-frame). The grouping may correspond to a particular order or pattern. Since the order or pattern may be identified from a fragment index, a client device may use this order or pattern to selectively download and decode frames of a particular frame type.

In one implementation, content packing logic 313 may pack encoded frames in an order that corresponds to the reference hierarchy of the corresponding fragment index. By using the reference hierarchy, content packing logic 313 may pack the frames in the order in which the frames will be downloaded and decoded. Therefore, reference frames of a fragment may be downloaded and/or decoded prior to non-reference frames of the same fragment.

In accordance with various implementations, virtual reality content is streamed in the form of base layers and enhancement layers. Content packing logic 313 may pack the frames of virtual reality content such that reference frames are packed in base layer(s) and non-reference frames are packed in enhancement layer(s). Therefore, a client device may easily identify and retrieve reference frames by accessing frames in the base layer(s).

In addition to providing access to content, content service 302 may also include a variety of information related to the content (e.g., manifests or other metadata) in data store 312 to which service 302 provides access. Alternatively, such information about the content, as well as the content itself may be provided and/or hosted by one or more separate platforms, e.g., CDN 304. It should be noted that, while logic 310, 311, and 313, video encoder 314, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
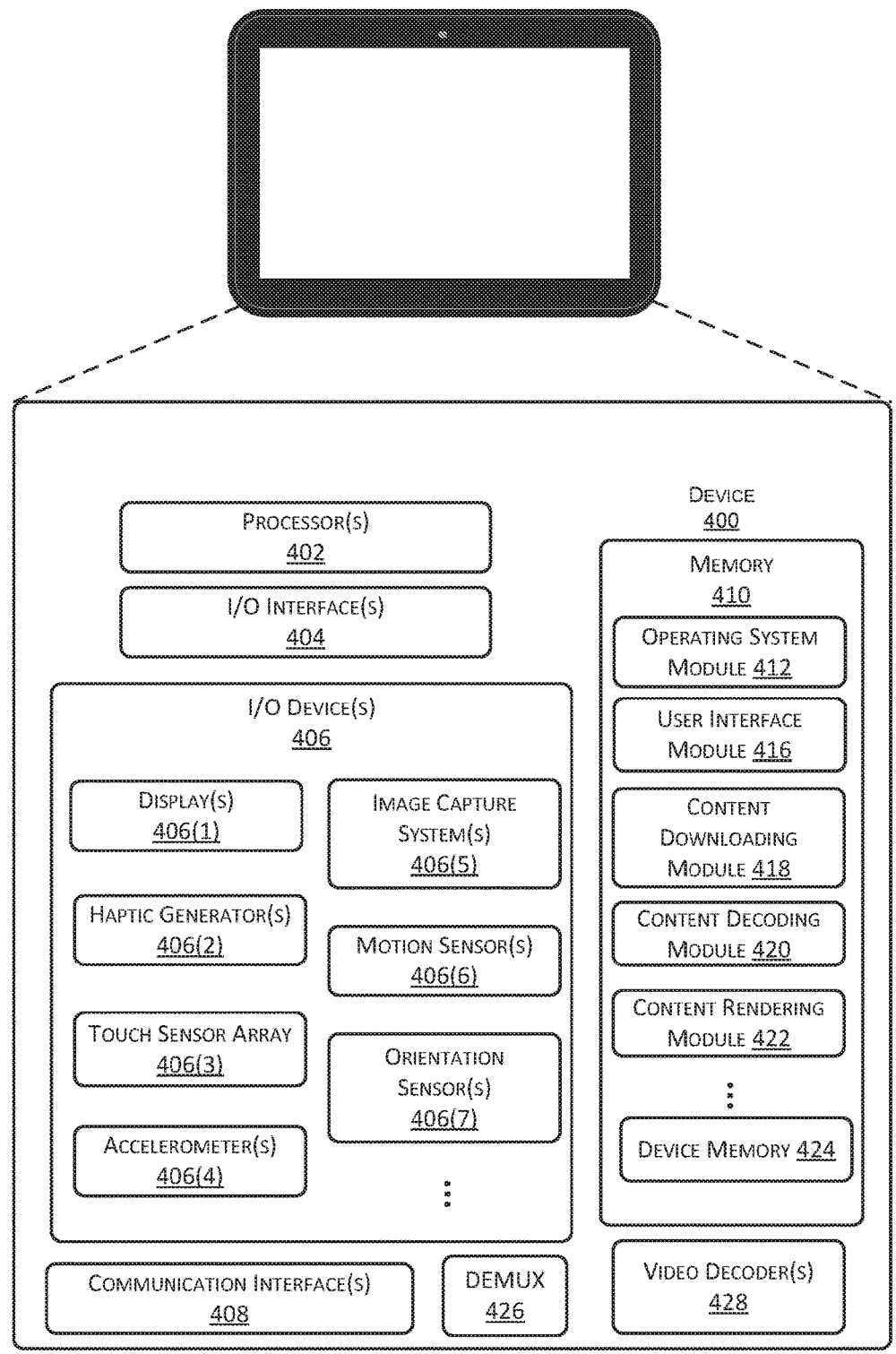
FIG. 4 is a simplified diagram of an example of a client device with which various implementations may be practiced.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-242 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth.

User interaction with the virtual reality environment may be detected via one or more of the I/O devices 406. For example, a position or perspective of a user in relation to his or her virtual reality environment may be detected via one or more of the I/O devices 406. Based upon the current position or perspective (e.g., angle) of the user within the virtual reality environment, device 400 may identify the portions (e.g., views) of the virtual reality environment that are visible from the current position/perspective and the portions of the virtual reality environment that are not visible from the current position/perspective Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, content downloading module 418, content decoding module 420, content rendering module 422, and other modules.

Content downloading module 418 downloads entire media fragments or specific frames from content service 204, as described herein. In some implementations, content downloading module 418 downloads reference frames corresponding to non-visible views. In a particular implementation, content downloading module 418 downloads frames of base layer(s) of the virtual reality content. For example, a predictive model may be applied to select the non-visible views for which to download reference frames. Content downloading module 418 may subsequently download non-reference frames as non-visible views become visible. In one implementation, the non-reference frames may be downloaded from enhancement layer(s) of the virtual reality content.

Content decoding module 420 selects frames to decode and sends the selected frames to a video decoder 248. More particularly, content decoding module 420 decodes reference frames for non-visible views, as will be described in further detail below. In some implementations, content decoding module 420 applies a predictive model to selectively decode reference frames that have been downloaded. Content decoding module 420 may subsequently decode non-reference frames as non-visible views become visible. Content rendering module 422 may render virtual reality content based on the decoded frames for the portions of the virtual reality environment that are in view.

Video decoder 428 includes software and/or hardware (e.g., electrical components or a circuit) configured to decode frames of video content files according to a corresponding video encoding standard such as H.264 or H.265. In one implementation, video decoder 428 operates according to a scalable encoding standard such as SHVC. A demultiplexer (DEMUX) 426 may demultiplex frames of fragments and pass the demultiplexed frames to decoder 428 for decoding.

Memory 410 also includes device memory 424 to store a wide variety of instructions and information using any of a variety of formats including, for example, flat files, databases, linked lists, trees, or other data structures. Such information includes content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the downloading, decoding, and rendering of virtual reality content may be implemented in a variety of ways. For example, at least some of this functionality may be implemented as part of the code of a media player operating on device 400. Alternatively, at least some of this functionality may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other device types including, for example, virtual reality headsets may also be used. The scope of this disclosure should therefore not be limited by reference to device-specific details.

Figure 5:
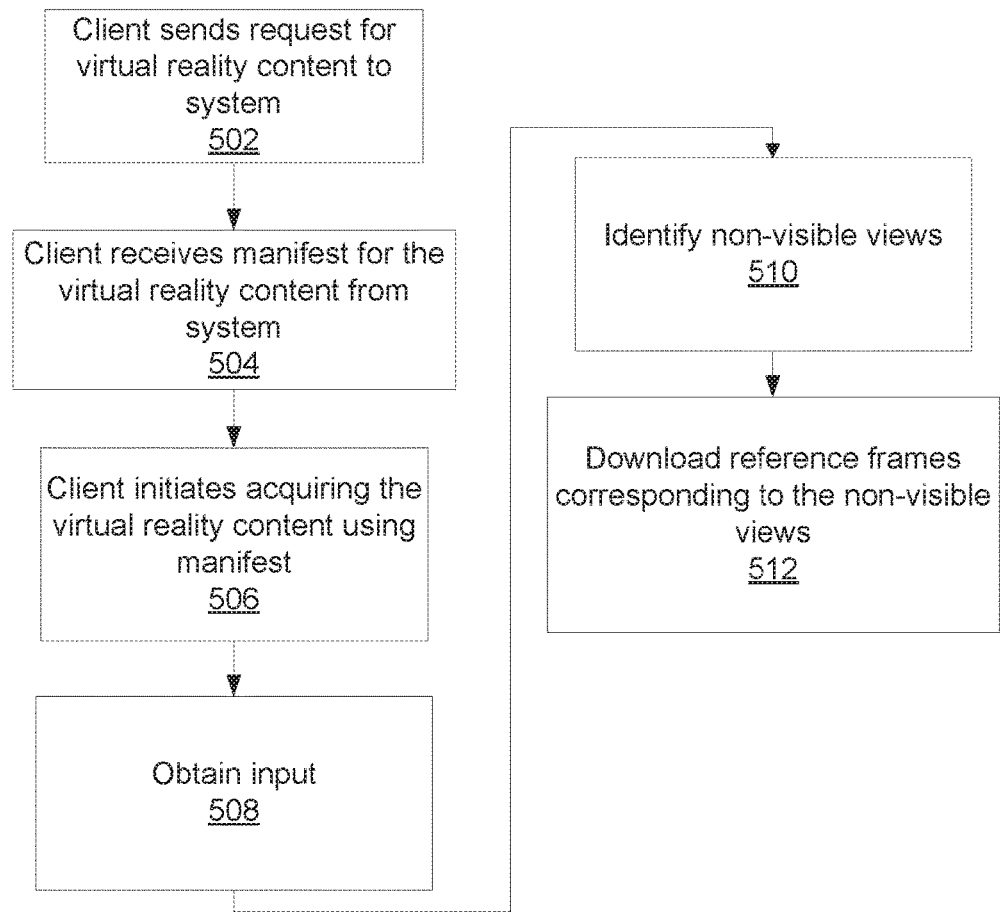
FIG. 5 is a flowchart illustrating a method of downloading virtual reality content according to a particular implementation.

FIG. 5 is a flowchart illustrating a method of downloading virtual reality content according to a particular implementation. A user may connect with a system offering a service such as a content service (or associated web site) via the Internet using a client device and browse a catalogue of virtual reality content items offered by the service.

Access to content over the Internet is typically governed by a digital rights management system such as Google's Widevine, Microsoft's PlayReady, Apple's FairPlay, or Sony's OpenMG to name a few representative examples. Content may be encrypted using any of a variety of encryption technologies including, for example, various Advanced Encryption Standard (AES) and Elliptic Curve Cryptography (ECC) encryption techniques. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 5, the user may connect to the system by completing a login process using the client device and, after selecting virtual reality content from the catalogue of virtual reality content, the client device sends a request to the system for virtual reality content (502). For example, the virtual reality content may be a 3D virtual reality game that enables the user to fly a plane and shoot at alien space ships.

The system provides the client device with a manifest that the client device can use to acquire selected frames of the fragments (also referred to as a group of pictures or GOP) of the video content file(s) that include the virtual reality content (504). Each fragment (also referred to as a group of pictures or GOP) starts with an index that identifies the frames of the fragment, the reference hierarchy (i.e., representing the dependencies between or among frames), and the offset of each frame in the file. The index may be provided in a header of a fragment. For example, this index is in the Movie Fragment ("moof") box of a media container file based on the ISO Base Media File Format, e.g., a the Common File Format (CFF) file, a Common Media Format (CMF) file, or an MP4 format file. As will be appreciated, these are merely examples of file types that may be used with implementations enabled by the present disclosure.

The client device can initiate acquiring the virtual reality content of the video content file(s) using the manifest received from the system (506). More particularly, the client device can download entire media fragments. Alternatively, the client device can download the indices (e.g., headers) of the media fragment(s) of the video content files so that frames may be selectively downloaded.

The manifest and/or the fragment index may be used to access frames for a particular view. More particularly, the manifest or fragment index may indicate the location (e.g., offset) of reference frames, non-reference frames, and/or frames of a particular frame type within the fragment for a particular view. In one implementation, for each fragment, the manifest identifies specific views, as well as byte ranges for groups of frames (e.g., groups of reference frames, groups of non-reference frames, or frames of a particular frame type).

In accordance with various implementations, each fragment index includes a reference hierarchy that indicates dependencies among the frames within the fragment. More particularly, the reference hierarchy may indicate those frames that are reference frames (e.g., I-frames, reference P frames, reference B frames), as well as those frames that are non-reference frames (e.g. non-reference P frames, non-reference B frames).

The client device may parse the reference hierarchy for a fragment to determine the dependencies between and among the frames of the fragment. Dependency information that indicates the dependencies among frames of a fragment (or portion thereof) may be maintained in the form of a tree or other suitable data structure.

Input detected or received via I/O device(s) of the client device may be obtained (508). More particularly, the input may indicate a position or perspective (e.g., viewing angle) of a user in relation to their virtual environment. For example, the input may be received or detected via sensors such as touch sensor array(s), accelerometer(s), image capture system(s), a motion sensor(s), orientation sensor(s), and/or a microphone. As another example, the input may be obtained from an external I/O device such as a wired glove. Upon detecting the current position or perspective, the client device can identify views that are most pertinent to the user's current position/perspective.

In one implementation, the virtual reality content includes a plurality of possible views. More particularly, the views of the virtual reality environment may include, for at least one position or perspective within the virtual reality environment, multiple views (e.g., corresponding to all of the faces of the three-dimensional cube or cylinder). Each of the views of the virtual reality environment corresponds to a sequence of frames including both reference frames and non-reference frames. The sequences of frames for the various views are synchronized in time.

The client device may identify or select a subset of the views (510), where each view in the subset is not visible from a current position or perspective of the user in relation to the virtual reality environment. For example, the subset of the views may include the views corresponding to a 3D virtual object that are not currently visible from the current position within the virtual reality environment, where the 3D virtual object is centered or includes the current position. As another example, the subset of the views may include those that have a high probability of being rendered (e.g., selected by the user) within a particular period of time. The subset of the views may be selected based, at least in part, on input received or detected via I/O device(s) integral with or coupled to the client device, network conditions, and/or the time that it takes to download content to the client device.

To determine those portions of the virtual reality environment that have a high probability of being viewed within a particular period of time, the client device may predict the user's future movements within the virtual environment. More particularly, the client device may determine those view(s) that have the highest probability of being accessed next by the user (e.g., by changing his or her location or perspective within the virtual reality environment) and/or the order in which the views will be accessed. For example, a predictive model may ascertain the possible paths (e.g., states) that the user may traverse within the virtual reality environment, and identify the views within those paths that have a high probability of being viewed next by the user (e.g., via interaction with the client device). The possible paths may be represented by a tree or other suitable data structure. Information that is used to predict the user's future movements within the virtual environment may include, but is not limited to, the direction that the user is facing or moving within the virtual environment, a speed with which the user is moving, sounds (e.g., noises or disturbances) within the virtual environment, sounds that the device may anticipate within the virtual environment, and/or the location or direction from which sounds are or may be transmitted within the virtual environment. In this manner, the client device may use a predictive model to select the reference frames to download, as well as determine the appropriate timing with which to download the reference frames.

In one implementation, for each non-visible view in the subset of views, the reference frames in the corresponding sequence of frames are downloaded while the view is not visible without downloading the corresponding non-reference frames (512). For a given view, the client device can download frames corresponding to the view using the fragment index. More particularly, the client device can request a portion of a fragment by requesting a particular byte range within the fragment, as will be described in further detail below. In one implementation, the client device downloads frames of base layer(s) for each non-visible view in the subset of views. The client device may store the frames in a frame buffer as they are acquired.

In accordance with various implementations, frames are packed for the fragment or view such that reference frames are grouped together in a sequence of frames and the non-reference frames are grouped together in a separate sequence of frames, enabling reference frames for a given view to be downloaded efficiently. Frames may also be grouped according to frame type.

According to one class of implementations, the fragments may be packed at the server side and downloaded in tier order, i.e., grouping frames in chunks of the same frame type, e.g., all of the I-frames, all of the reference P-frames, all of the reference B-frames, etc. For example, frames may be grouped in chunks according to a particular pattern (e.g., I-frames, followed by reference P-frames, etc.). This would allow for the client to request only certain types of frames, e.g., to request only I-frames and reference P-frames.

In implementations in which the frames of a fragment are packed at the server side according to tier order or frame type, the partial fragment request might specify one or more byte ranges that correspond to one or more types of frames. That is, because the frames are arranged in a fragment according to frame type, the client device can use the fragment index to identify the byte range corresponding to frames of a particular type. The request could then be generated to request the byte range(s) associated with specific frame types. For example, the client may request only the I-frames and some of the reference P-frames.

The client device may track which frames have been downloaded. More particularly, the client device may track the frames that are downloaded for each view. For example, the client device may track whether reference frames have been downloaded for a given view and/or the type of reference frames that have been downloaded for a given view.

When a view in the subset of the views later becomes visible to the user at a subsequent position/perspective within the virtual reality environment, non-reference frames in the sequence of frames associated with the view may be downloaded. Non-reference frames may continue to be downloaded from that point in time forward. Where a view is visible and corresponding reference frames have not previously been downloaded, both reference and non-reference frames associated with the view are downloaded. By selectively downloading reference frames for portions of the virtual reality environment not currently in view, the amount of data that is streamed over the Internet and downloaded to a client device to generate 3D virtual reality video may be significantly reduced.

In accordance with various implementations, the client device may download frames such that the duration of the frame buffer is maintained at a minimum threshold level to ensure that frames can be continuously decoded and rendered by the client device without interruption. For example, the client device may maintain a count of the number of frames or bytes in the frame buffer. In addition, the buffer duration of the currently downloading frames may be added to the buffer duration. The determination of buffer duration may also account for data being processed in the demultiplexing and/or decoding pipelines that has not yet been displayed.

Figure 6:
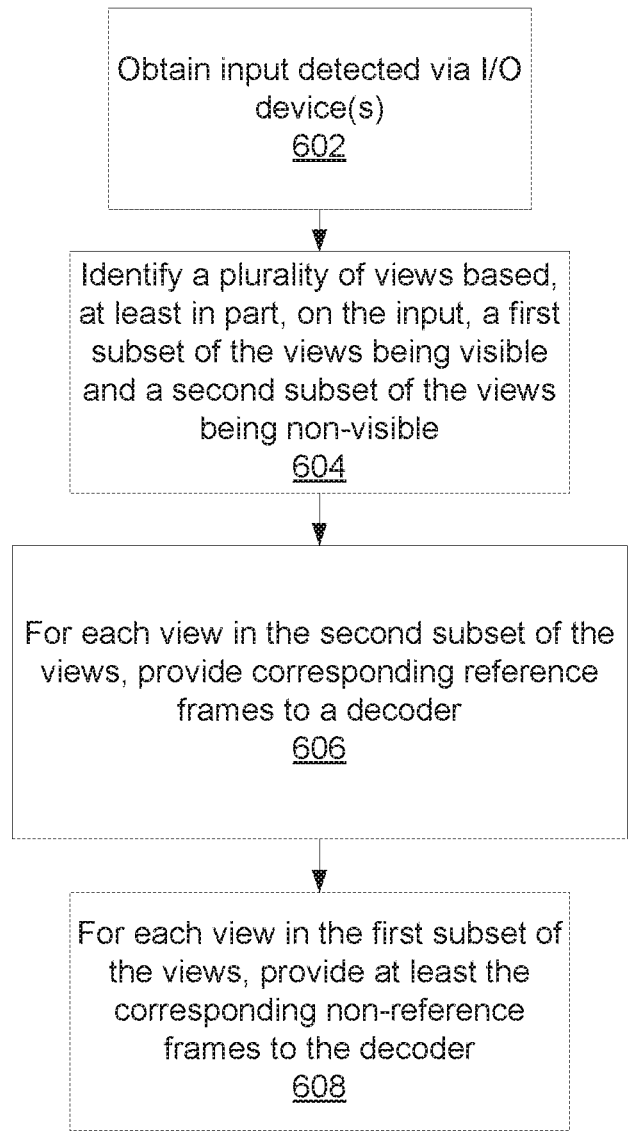
FIG. 6 is a flowchart illustrating a method of decoding virtual reality content according to a particular implementation.

FIG. 6 is a flowchart illustrating a method of decoding virtual reality content according to one implementation. The client device may obtain input that has been received or detected via one or more I/O device(s), where the input indicates a current position/perspective within the virtual reality environment (602). The I/O device(s) may be integral to the client device or external to the client device.

The client device identifies a plurality of views of virtual reality content based, at least in part, on the input (604).

Each of the views has a corresponding sequence of frames including both reference frames and non-reference frames of the virtual reality content. In addition, each of the views may correspond to one of a plurality of portions of a virtual three-dimensional object in a virtual reality environment.

A first subset of the views is visible from the current position, while remaining views are not visible from the current position. For example, non-visible views may correspond to non-visible portions of a virtual three-dimensional object that is centered upon the current position. As another example, non-visible views may include those that can only become visible from other positions within the virtual reality environment.

A second subset of the views not visible from the current position may be identified or selected for decoding of corresponding reference frames. In other words, the second subset of the views for which reference frames are decoded may be selected from a larger set of non-visible views. For example, a particular number of non-visible views may be selected. The number of non-visible views that are selected may be determined based upon factors such as decoder delays, the average number of reference frames per view, etc. By selectively decoding reference frames for only a subset of the non-visible views, the decoding process and the use of decoder resources may be optimized while ensuring that a continuous uninterrupted virtual reality experience is provided to the user.

In accordance with various implementations, a predictive model is applied to select the second subset of the views (e.g., views that are not visible from the current position/perspective within the virtual reality environment). For example, a particular number of non-visible views may be selected based, at least in part, on the probability that the corresponding views will be accessed next by the user (e.g., within a particular period of time). A decode order may be assigned to the views or associated frames (e.g., reference frames) based, at least in part, on the probability that the views will be selected by the user within a particular period of time and/or the order in which the user is likely to access the various views of the virtual reality environment. Reference frames for those portions of the virtual reality environment not currently in view may be decoded according to the decode order. In this manner, a predictive model may be applied to select reference frames to decode, as well as determine the timing with which the reference frames are to be decoded. The information used by a predictive model to select views for decoding of reference frames may be different from the information used to select views for downloading of reference frames.

For each non-visible view in the second subset of the views, the client device may decode reference frames in the corresponding sequence of frames without decoding corresponding non-reference frames for the view (606). More particularly, the reference frames for a particular view that is not visible from the current position may be provided, while the particular view is not visible, to a decoder of the client device without providing the non-reference frames for the view to the decoder. The reference frames may be provided to the decoder with a frequency that may be determined based upon factors such as decoder delay and/or the frequency with which the user's position within the virtual environment changes. In this manner, decoding resources may be optimized while ensuring an uninterrupted viewing experience.

The reference frames that are provided to the decoder may include I-frames, reference P-frames, and/or reference B-frames. In some implementations, all of the reference frames for a particular view are provided to the decoder. In other implementations, only a subset of the reference frames for a particular view is provided to the decoder. In some implementations, the client device may decode only certain types of reference frames e.g., only I-frames and reference P-frames or, alternatively, may decode reference frames in tier order e.g., I-frames, followed by reference P-frames. By decoding frames in tier order, playback may be achieved with an acceptable level of visual artifacts.

The client device may track which frames have been decoded. More particularly, the client device may track the frames that are decoded for each view. For example, the client device may track whether reference frames have been decoded for a given view and/or the type of reference frames that have been decoded for a given view.

Since some non-visible views will not subsequently become visible, the corresponding non-reference frames need not be decoded. As a result, the number of frames that are decoded is significantly lower than traditional decoding schemes. Therefore, decoding resources can be conserved while providing a continuous virtual reality experience.

For each view in the first subset of the views (i.e., visible views), at least the non-reference frames in the corresponding sequence of frames are provided to the decoder (608). More particularly, when a non-visible view in the second subset of the views later becomes visible to the user from a subsequent position/perspective within the virtual reality environment, corresponding non-reference frames may be decoded (e.g., provided to the decoder for decoding) without decoding the previously decoded reference frames. Non-reference frames may continue to be decoded from that point in time forward. Alternatively, where a view becomes visible and corresponding reference frames have not previously been decoded, both reference and non-reference frames associated with the view are decoded. In this manner, both reference frames and non-reference frames for the views that are visible to the user may be decoded. By selectively decoding reference frames that are most pertinent to the position and perspective of the user within the virtual reality environment, the amount of data that is decoded to generate 3D virtual reality video may be minimized. In this manner, the performance of a video decoder may be optimized.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   receiving, with a computing device, input that has been received or detected via one or more input/output (I/O) devices;

determining, with the computing device, a current position within a virtual reality environment based, at least in part, on the input;

identifying, with the computing device, a plurality of views of virtual reality content based on the current position, each of the views corresponding to one of a plurality of portions of a virtual three-dimensional object in the virtual reality environment that includes the current position, each of the views corresponding to a sequence of frames including both reference frames and non-reference frames of the virtual reality content, a first subset of the views being visible from the current position, a second subset of the views not being visible from the current position;

for each of the first subset of the views, decoding, with the computing device, both the corresponding reference frames and the corresponding non-reference frames;

for each of the second subset of the views, decoding, with the computing device, only the corresponding reference frames;

determining, with the computing device, that a particular view in the second subset of the views is likely to become visible; and for the particular view, decoding, with the computing device, the corresponding non-reference frames.

2. The method as recited in claim 1, further comprising:
identifying, with the computing device, for each view of the second subset of the views, the reference frames using a reference hierarchy of a fragment of the virtual reality content.

3. The method as recited in claim 1, further comprising:
assigning, with the computing device, priorities to at least a portion of the plurality of views such that each of the portion of the plurality of views is assigned a corresponding one of the priorities based, at least in part, on probabilities associated with the views, each of the probabilities indicating a likelihood that the corresponding view will become visible within a particular period of time; and
selecting, with the computing device, the second subset of the views based, at least in part, on the priorities.

4. The method as recited in claim 1, further comprising:
for each view of the second subset of the views, downloading, with the computing device, only the corresponding reference frames of the virtual reality content while the second subset of the views are not visible; and
for each view of the first subset of the views, downloading, with the computing device, both the corresponding reference frames and the corresponding non-reference frames while the first subset of the views are visible.

5. A device, comprising:
a decoder configured to decode video frames encoded according to a particular encoding standard; and
one or more processors and memory configured to:
receive input generated by one or more input/output (I/O) devices;
identify a plurality of views of virtual reality content based, at least in part, on the input, each of the views corresponding to a sequence of frames including both reference frames and non-reference frames of the virtual reality content, a first subset of the views being visible, a second subset of the views not being visible;
for each of the first subset of the views, transmit both the corresponding reference frames and the corresponding non-reference frames to the decoder for decoding; and for each of the second subset of the views, transmit only the corresponding reference frames to the decoder for decoding.

6. The device as recited in claim 5, the processors and memory being further configured to:
after determining that a view in the second subset of the views is visible, provide the corresponding non-reference frames to the decoder.

7. The device as recited in claim 5, the processors and memory being further configured to:
select, for each view of the second subset of the views, the reference frames using a reference hierarchy of a fragment of the virtual reality content.

8. The device as recited in claim 5, the processors and memory being further configured to:
for each of the second subset of the views, obtain the corresponding reference frames from one or more base layers.

9. The device as recited in claim 5, the processors and memory being further configured to:
assign priorities to at least a portion of the plurality of views such that each of the portion of the plurality of views is assigned a corresponding one of the priorities based, at least in part, on probabilities associated with the views, each of the probabilities indicating a likelihood that the corresponding view will become visible within a particular period of time; and
select the second subset of the views based, at least in part, on the priorities.

10. The device as recited in claim 5, the processors and memory being further configured to:
for each view of the second subset of the views, download only the corresponding reference frames of the virtual reality content while the second subset of the views are not visible.

11. The device as recited in claim 5, the processors and memory being further configured to:
identify, using a fragment index, a byte range corresponding to frames of a particular frame type;
generate a request for the byte range; and
transmit the request.

12. The device as recited in claim 5, wherein each of the views corresponds to one of a plurality of portions of a virtual three-dimensional object.

13. A computer program product, comprising one or more non-transitory computer readable media having computer program instructions stored therein, the computer program instructions being configured such that, when executed by one or more processors, the computer program instructions cause the one or more processors to:
obtain input received or detected via one or more input/output (I/O) devices;
identify a plurality of views of virtual reality content based, at least in part, on the input, each of the views corresponding to a sequence of frames including both reference frames and non-reference frames of the virtual reality content, a first subset of the views being visible, a second subset of the views not being visible;
for each view of the first subset of the views, provide both the corresponding reference frames and the corresponding non-reference frames to a decoder for decoding; and
for each view of the second subset of the views, provide only the corresponding reference frames to the decoder for decoding.

14. The computer program product as recited in claim 13, wherein the computer program instructions are further configured to cause the one or more processors to:

after determining that a view in the second subset of the views is visible, provide the corresponding non-reference frames to the decoder.

15. The computer program product as recited in claim 13, wherein the computer program instructions are further configured to cause the one or more processors to:

identify, for each view of the second subset of the views, the reference frames using a reference hierarchy of a fragment of the virtual reality content.

16. The computer program product as recited in claim 13, wherein the computer program instructions are further configured to cause the one or more processors to:

assign priorities to at least a portion of the plurality of views such that each of the portion of the plurality of views is assigned a corresponding one of the priorities based, at least in part, on probabilities associated with the views, each of the probabilities indicating a likelihood that the corresponding view will become visible within a particular period of time; and select the second subset of the views based, at least in part, on the priorities.

17. The computer program product as recited in claim 13, wherein the computer program instructions are further configured to cause the one or more processors to:

for each view of the second subset of the plurality of views, download only the corresponding reference frames of the virtual reality content while the second subset of the views are not visible.

18. The computer program product as recited in claim 13, wherein the computer program instructions are further configured to cause the one or more processors to:

identify, using a fragment index, a byte range corresponding to frames of a particular frame type;

generate a request for the byte range; and transmit the request.

19. The computer program product as recited in claim 13, wherein the computer program instructions are further configured to cause the one or more processors to:

for each of the second subset of the views, obtain the corresponding reference frames from one or more base layers.

20. The computer program product as recited in claim 13, wherein each of the views corresponds to one of a plurality of portions of a virtual three-dimensional object.

\* \* \* \* \*